June 17, 1958     W. T. HANLEY     2,839,734
FREQUENCY SLOPE DETECTION SONAR

Filed May 1, 1950     2 Sheets—Sheet 1

INVENTOR
WILLIAM T. HANLEY
BY *A. H. Helvestine*
*George Sipkin*
ATTORNEYS

June 17, 1958      W. T. HANLEY      2,839,734
FREQUENCY SLOPE DETECTION SONAR
Filed May 1, 1950      2 Sheets-Sheet 2
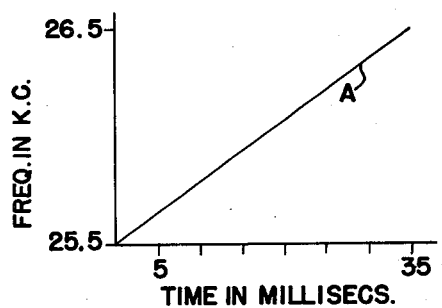
FIG. 3.
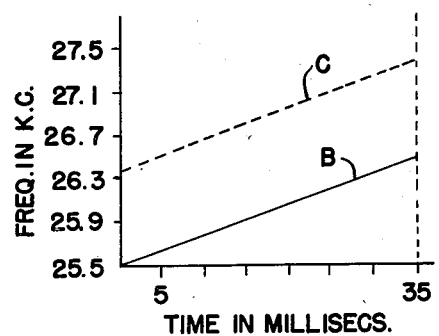
FIG. 4.
FIG. 5.
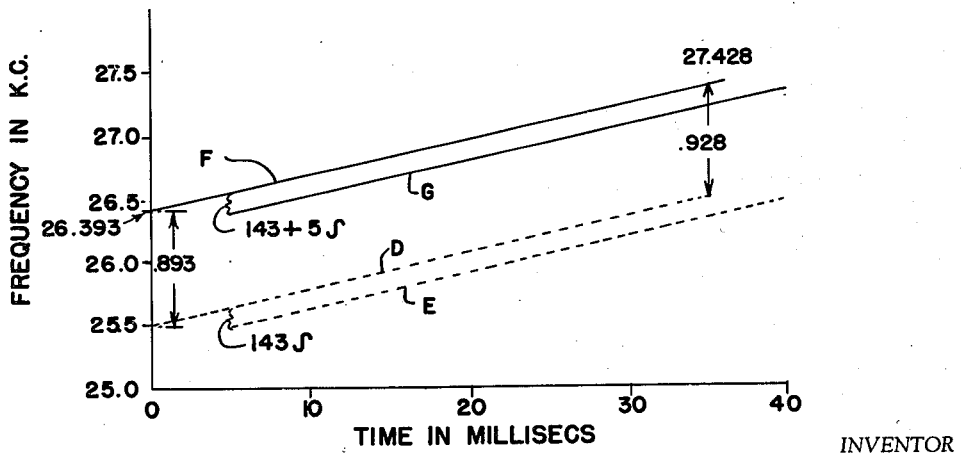
INVENTOR
WILLIAM T. HANLEY
BY
ATTORNEYS

United States Patent Office 2,839,734
Patented June 17, 1958

2,839,734

FREQUENCY SLOPE DETECTION SONAR

William T. Hanley, Washington, D. C.

Application May 1, 1950, Serial No. 159,353

5 Claims. (Cl. 340—3)

(Granted under Title 35, U. S. Code (1952), sec. 266)

The invention described herein may be manufactured and used by or for the Government of the United States for governmental purposes without the payment of any royalties thereon or therefor.

The present invention relates to a frequency slope detection sonar system and more particularly to a sonar system in which the transmitted pulses are frequency swept over a limited band and a portion of the echo signal received is delayed and beat with the undelayed echo signal to produce another signal almost independent of Doppler shift. A narrow band filter can then be used resulting in a high signal to noise ratio.

Background noise and dopplers have been and still are the most difficult problems which have to be solved in order to increase target detection range by means of pulsed sonar equipment. Prior known systems have attempted, in a number of ways, to minimize these dopplers and thereby increase the signal to noise ratio of the received echo, but all of these systems have inherent disadvantages. Listed hereinbelow are several of such systems with the disadvantage peculiar to each.

Own Doppler Nullification. The band pass of sonar constant-wave receivers must be wide enough to pass the transmitted signal plus any change in this frequency due to the effect of doppler which is caused by the relative rate of change in range between the transmitting ship and its target. Since doppler is approximately equal to seven tenths of a cycle for each knot of range rate times the transmission frequency in kilocycles, this effect is large at high range rates and high frequencies. The most common method of narrowing the receiver band pass requirements is to provide means for cancelling the doppler effect due to own ship motion. This may be accomplished either by controlling the oscillator in the transmitter or in the receiver so that its frequency varies by an amount equal and opposite to the doppler effect due to own ship. However, the disadvantage of this system is that if the doppler correction is obtained by a computer which requires own ship's course and speed information, the system is complicated and is in error by the errors in the supplied information. Furthermore, reverberations are not reduced.

Another system is Target Doppler Nullification. This system reduces band pass of the receiver due to target relative motion, and is usually accomplished by sampling the received signal by means of a discriminator which controls a beat frequency oscillator so that its frequency is equal and opposite to the target effect. However, the disadvantage of this system is that since corrections are usually obtained by sampling the returning signal, high target noise or own ship noise can render the system ineffective, and also reverberations are not reduced.

Still another prior known system is Amplitude Modulation of Transmission Frequency. Modulating the transmission frequency by a low frequency note makes it possible to improve the signal to noise ratio in sonar receivers by detecting the returning signal and filtering for the modulation note. Since doppler is proportional to frequency, the band pass of the filter can be low because the doppler effect on the modulation note is small. The disadvantage of this system is that some demodulation of signal results and the reverberations are not reduced.

Yet another prior method is Multiple Narrow Band Filters. In this system, signal to noise improvement is realized by using a number of narrow filters which subdivide the band pass of the receiver that is required by the doppler. Thus, if the doppler requires a band pass of 3000 cycles this can be divided into ten bands each of 300 cycles wide by means of ten filters. However, the use of multiple filters adds to the weight, cost and complexity of the receiver, and the reverberations are not reduced.

The present invention has many advantages over prior art methods for improving signal to noise ratio, and a single narrow band filter gives a ratio better than that obtained from equipment using as many as 48 filters or some other form of doppler nullification. Also reverberations will be reduced and since they are proportional to pulse length for constant-wave signals, use of a frequency sweep will reduce the reverberation (using the same power) by at least 13 and possibly as much as 20 db. Furthermore, the present invention has the advantage of a sizeable saving in the weight of the equipment. Old type equipment requires at least 2800 pounds of power supply and driver to put 50 kw. into the transducer; this weight being required since it is essential to maintain a fixed frequency. Since slope detection can work on a negative slope, it is possible to use a high frequency motor generator to obtain the same power by allowing the motor generator set to slow down during the pulse. The weight of the generator set would be approximately 1300 pounds and thereby a saving in weight of approximately 1500 pounds could be realized.

Yet another advantage of the present invention is that mutual interference between ships can be reduced by having each ship transmit a different frequency slope. Since the slope and not the transmitted frequency controls the center frequency of the filter, it is possible to reduce interference on ships using identical transducers.

Rate of return of target information could be increased by providing sonar equipment with two or more frequency transmission slopes. Since the filters are narrow, alternate pinging could be used thus increasing the rate of return of information proportional to the number of frequency slopes used.

An object of the invention is the provision of a method and means for increasing the signal to noise ratio in a sonar system.

Another object is the detection by a receiver of the frequency slope of a transmitted signal.

A further object is the provision of means for increasing the performance of a sonar system by minimization of the doppler effect.

A final object is the provision of means for reducing the weight and complexity of a sonar system.

Other objects and many of the attendant advantages of this invention will be readily appreciated as the same becomes better understood by reference to the following detailed description when considered in connection with the accompanying drawings in which like reference numerals designate like parts throughout the figures thereof and wherein Fig. 1 shows a block diagram of the circuit comprising the invention;

Fig. 3 is a graph illustrating the manner in which the transmitter frequency varies with time;

Fig. 4 is a graph illustrating the manner in which the echo received varies in frequency due to doppler; and Fig. 5 is a graph illustrating the relationship between the two signals at the input of the mixer stage.

Figure 1:
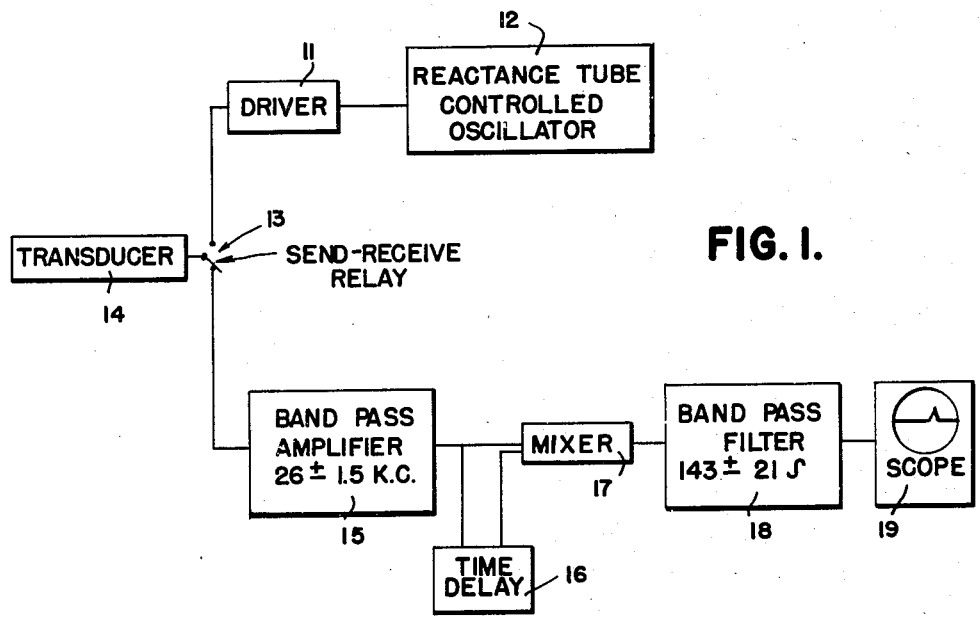

Referring now to the drawings, there is shown in Fig. 1, which illustrates a block diagram of the circuit comprising the invention, a conventional sonar transmitter, or driver 11, which is coupled with and responsive to signals received from an oscillator 12. The oscillator 12 may be of any well-known design which may be used to determine the frequency of driver 11, except that it has been modified so that it is controlled by a reactance tube; such a circuit being familiar to anyone skilled in the electronic art. As a result of the control imposed on driver 11, by reactance tube oscillator 12, the transmitted pulses are frequency swept over a predetermined, limited band.

Coupled to the output of driver 11 is a send-receive relay 13 which acts to connect a transducer 14 to driver 11 when the equipment is being keyed to transmit a pulse; the relay 13 thereafter connecting transducer 14 to the receiver portion of the system so as to give an indication when, and if, an echo pulse is received.

Connected to the output of transducer 14, by means of one set of contacts on relay 13, is a band pass amplifier 15, whose output, in turn, is divided between a time delay device 16 and a mixer 17. The purpose of the time delay device 16 will be more fully described hereinafter. In series relation with the output of mixer 17 is a band pass filter 18 and any convenient echo indicating device 19, which in Fig. 1 is illustrated as a cathode ray tube, but which may also be a loudspeaker. The range of frequencies covered by the band pass amplifier 15 and band pass filter 18 will be described in greater detail hereinafter.

Figure 2:
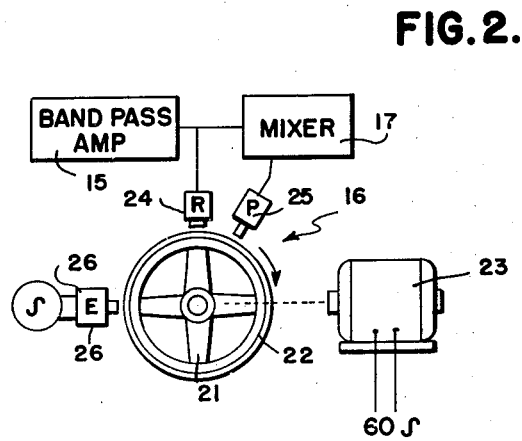
Fig. 2 is a more detailed showing of one embodiment of the time delay device.

In Fig. 2 there is illustrated one embodiment of the time delay device 16, but it is to be understood that any similar time delay such as a delay line or film mounted upon a rotating disc would also be satisfactory. In this embodiment, however, there is a wheel 21, around the periphery of which is fastened some magnetic material such as wire or tape 22, or the like, while the wheel is rotated in a clockwise direction as viewed from Fig. 2 by means of a constant speed synchronous motor 23. Positioned near the wire 22, and connected to the output of band pass amplifier 15, is a recording head 24. Also positioned near wire 22, but connected to mixer 17, is a reproducing head 25 which is so placed with relation to the recording head 24, and the speed at which wheel 21 is revolving, that any signal stored on the wire by the recording head is reproduced in the mixer 17 after a 5 millisecond delay. Any signal stored on the wire is removed by an erasing head 26 before wheel 21 makes a complete revolution. It is clear from this arrangement that two signals are fed to mixer 17; namely, one directly from the output of the band pass amplifier, and another which is similar to the first signal but delayed by 5 milliseconds.

The graphs shown in Figs. 3, 4 and 5 illustrate the various relationships between the transmitted pulse, a received echo pulse, and the doppler effect. For convenience and clarity the up-doppler only is shown in these views, and it is to be understood that a similar doppler curve may be drawn on the lower side of the received echo curve. Referring now to Fig. 3, graph A, shown therein, illustrates how the transmitted pulse is frequency swept over a fixed range of frequencies and how it linearly shifts from 25.5 kc. to 26.5 kc. during a pulse width of 35 milliseconds.

In Fig. 4, graph B represents a return echo pulse, which has been received after ideal conditions of transmission through the sea and where there has been no change in range rate between the transmitter and echoing object. Under these conditions there is no doppler effect, and it is to be noted that the pulse shifts in frequency in exact conformance with the transmitted pulse as shown at A, Fig. 3. Graph C (Fig. 4) illustrates a return pulse under the influence of an up-doppler, caused by a 50 knot closing range rate. It can be clearly seen that the first instant the return pulse is received it has jumped up in frequency from the frequency at which the transmitted pulse was emitted. The determination of this increase in frequency will be more clearly disclosed hereinafter. It should also be noted that if there is a 50 knot opening range rate, then the return pulse line will be similar to graph C but displaced on the lower side of graph B. The down-doppler graph has been omitted from Fig. 4 for simplicity.

The graphs of Fig. 5 show the relationship of the signals entering mixer 17, wherein graph D is the direct signal, as it would appear without any doppler, while graph E is the delayed signal, without doppler, after it has passed through delay device 16. It is to be noted that the start of E has been delayed exactly 5 milliseconds from that of D, by delay device 16. The graph F illustrates how the direct signal pulse would appear if there was an up-doppler present, while graph G shows the delayed signal pulse with an up-doppler. Graph F is not exactly parallel with D, nor is G parallel with E, since a signal influenced by doppler does not have the exact linearity of a signal where there is no doppler, such as shown by graphs D and E. Graphs similar to F and G may be drawn where there is a down doppler under conditions of opening range rate. When delayed and undelayed signals, without doppler, are beat together as in the mixer stage 17, there results a beat note of 143 cycles. When the two signals have doppler included the beat note will be 143 plus 5 cycles (Fig. 5).

In operation the present invention functions, broadly speaking, similar to other familiar types of sonar equipment in that a pulse of energy is transmitted from the driver to the transducer and thence into the surrounding water, after which the transducer is connected to the receiving portion of the circuit so that any echo pulse present may be received, altered to some other wave shape, and finally fed to some form of indicating device whereby the presence of a target and its range are observable. Specifically the operation of the present invention is such that the driver 11, under control of the reactance tube oscillator 12, transmits by means of the transducer 14, a pulse of energy which is 35 milliseconds in duration and which linearly increases in frequency with pulse duration from 25.5 kc. to 26.5 kc. After the transmitted pulse has been emitted, send-receive relay 13 operates to connect transducer 14 directly to band pass amplifier 15. The received signal is amplified by the element 15 and a portion of it is fed directly to the input of mixer 17. Simultaneously with this a portion of the signal from amplifier 15 is fed to the recording head 24 of time delay device 16, the wheel 21 of which is rotating at such speed that reproducing head 25 picks up the recorded signal from magnetic tape 22 after a delay of exactly 5 milliseconds. The delayed signal is likewise fed into the input of mixer 17 which beats together the two signals which it is receiving in order to obtain the difference frequency between them. This difference frequency then passes from mixer 17 through band pass filter 18 which is designed to pass a narrow band of frequencies, as will be more fully described hereinafter, and the output of the filter is fed to an indicating device 19 which is shown here as a cathode ray tube. The indicator 19, if desired, may be a loudspeaker so that an echo is audible, or else a speaker and cathode ray tube may be employed simultaneously to give both visual and audible indications of an echo.

As stated previously herein the purpose and concept of the instant invention is to improve the signal to noise ratio in sonar equipment through the expedient of a pulsed frequency sweep transmission which is not materially affected by the doppler effect. The system is based upon the fact that if a frequency swept pulse is transmitted into the sea, the frequency slope is practically independent of changes in range, and therefore doppler. For instance, if a transmitted 35 millisecond signal, which linearly increases in frequency from 25.5 kc. to 26.5 kc., is subjected to a 50 knot closing range rate, the frequency of the returning signal would linearly increase from 26,393 to 27,428 cycles, which is the transmitted frequency plus doppler. However, the difference in frequency between the beginning and end of the returning pulse is 1,035 cycles, or 27,428 minus 26,393, which is only 35 cycles greater than the difference in transmitted frequency (26.5 minus 25.5 kc.).

The frequency shift due to doppler effect can be accurately computed and is equal to approximately seven tenths of a cycle for each knot of range rate times the transmission frequency in kilocycles. Thus in the example above this gives .7×50×25.5=893 cycles for the low end of the band and .7×50×26.5=928 cycles for the upper end. The frequency shift due to the doppler, when added to the transmitted frequency, equals the frequency of the returning echo pulse, such as 25,500 plus 893=26,393 cycles and 26,500 plus 928=17,428 cycles. This is clearly illustrated in Fig. 5.

Since frequency slope is determined by change in frequency divided by time, if a small segment, for example 5 milliseconds, is selected from the pulse duration of 35 milliseconds, then the difference in frequency due to doppler is found to be one seventh of the doppler for the whole period, or 1/7×35=5 cycles only. Therefore, if a system is used in which the frequency change in a 5 millisecond period is determined, as by beating together the delayed and undelayed signals, the resultant band pass of the receiver need only be plus or minus 5 cycles greater than that required by the pulse length of the received signal itself. It can be clearly seen, therefore, that by means of the present invention, the undesirable doppler effect is reduced to a minimum, thereby permitting the use of very narrow band pass filters which are hardly wider than the received signal pulse, and in this manner extraneous noise is filtered out resulting in greatly improved signal to noise ratio.

The band pass of amplifier 15 is controlled by the range of the frequency sweep of the transmitted signal plus doppler shift due to a 50 knot range rate. Therefore, since the center frequency of the transmitted pulse is 26 kc., and the doppler shift is approximately plus or minus 1.5 kc., then the band pass of amplifier 15 is made 26 kc. plus or minus 1.5 kc.

The determination of the narrow band filter 18 is as follows. Since this unit filters for the difference frequency of the delayed and undelayed signals, and since the transmitted signal varies by 143 cycles in 5 milliseconds, or 1/7×1000, then this controls the center frequency of the filter. The band pass is controlled by the pulse length of the received signal plus the change in frequency slope due to doppler. It is to be noted that the signal passed through filter 18 is 5 milliseconds shorter than the transmitted signal, or in other words of 30 millisecond duration, and since band pass may be computed from the formula one over the pulse length in seconds, or 1/.030, it is found that the pass band is at least 32 cycles or plus or minus 16 cycles from the midpoint. The doppler change, as explained above, is plus or minus 5 cycles and when this is added to the plus or minus 16 cycles, it results in a band pass of plus or minus 21 cycles from a midpoint. In order to be able to pass all signals fed to it, the filter 18 must then have a band pass of 143 plus or minus 21 cycles.

Inasmuch as slope detection can be accomplished by means other than the magnetic recorder, it is to be understood that modifications to the present invention are possible. Any device which will delay part of the signal for the desired time interval can be used. For instance, an acoustic or electric delay line or film recording device can replace the magnetic recorder.

Another method of frequency slope detection which may be used requires a number of narrow band filters whose center frequencies are exactly separated in such a manner that each filter passes a band that is equivalent to the total band pass of the amplifier divided by the number of filters used. These filters receive the output of the amplifier, and since the received signal changes its frequency with time, each of the filters in the frequency band of the signal will respond or have its maximum output at different times. Since the filters are evenly spaced in frequency, their outputs will also be evenly spaced in time. Therefore, if these outputs are rectified and combined the combined output will be a low frequency signal which can be filtered for by means of a very narrow filter whose band pass is controlled practically by the pulse length of the transmitted signal.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A frequency slope detection sonar system comprising a transducer for receiving a frequency swept pulse signal, a receiver portion, said receiver portion including a broad band pass amplifier connected to the transducer for amplifying and passing said pulsed sweep frequency signal therethrough, a mixer connected to the output of the amplifier, time delay means also connected to the output of the amplifier, the output of the time delay means likewise connected to the input of the mixer, whereby a portion of the pulsed sweep frequency signal is fed directly to the mixer while a second portion of said signal is delayed a predetermined period of time, a narrow band pass filter in series with said mixer having a band width substantially equal to the frequency change of the pulsed sweep frequency signal during the delay period, and indicating means to display the received signal.

2. The device of claim 1 wherein said time delay means comprises a rotating wheel, magnetizable material positioned around the periphery of the wheel, a recording head connected to said amplifier, a reproducing head positioned a predetermined distance from the recording head and connected to said mixer, and an erasing head, whereby any signal from the amplifier is recorded on the magnetizable material and reproduced into the mixer after a predetermined delay, said recorded signal later being erased before the wheel has made a complete revolution.

3. A frequency slope detection sonar system comprising a transducer for receiving signals swept over a predetermined band of frequencies, a receiver portion having a band pass amplifier, a time delay means and a mixer, said amplifier being connected to the transducer, the mixer being connected in series with the amplifier, said time delay means being connected so as to delay a portion of the output of the amplifier a predetermined time before applying it to the mixer, a narrow band signal produced by the mixer, a band pass filter having a band width equal to the frequency change of the swept signals in series with said mixer, and indicating means to display the signal from said filter.

4. Apparatus for minimizing doppler and improving the signal to noise ratio in a sonar system comprising a transducer to receive a signal swept over a predetermined band of frequencies, an amplifier connected to the transducer, said amplifier arranged to pass all of said band of frequencies, means for delaying for a predetermined time a portion of the amplifier output, means to beat together the delayed and undelayed portions of the amplifier output to obtain a narrow band difference signal the frequency of which in turn is equal to the change in frequency of said undelayed frequency swept signal during said predetermined time delay period, a band pass filter adapted to pass said difference signal, and indicating means to display the output of said filter, whereby said signal is practically independent of changes in range and therefore doppler.

5. A sonar detection system comprising a pulse generating means, said pulse having a frequency increasing with time, a driving means connected to said pulse generating means to amplify the signal produced, a transducer connected to radiate the output of said driving means and to receive echoes returned from a target, a band pass amplifier connected to said transducer to amplify said echoes, a time delay means connected to the output of said band pass amplifier to delay a portion of said returned signal a fraction of the pulse width of the original transmitted signal, a mixer connected to receive the undelayed portion of the returned signal from the band pass amplifier and the delayed portion of the returned signal from the time delay means to mix said signals to obtain a beat frequency, a band pass filter connected to said mixer to receive said beat frequency and adapted to pass the difference frequency of said undelayed and said delayed signals, and indicating means to indicate the presence of said difference frequency.

References Cited in the file of this patent

UNITED STATES PATENTS

| | | |
|---|---|---|
| 2,166,991 | Guanella | July 25, 1939 |
| 2,214,929 | Koschmeider | Sept. 17, 1940 |
| 2,405,134 | Brown | Aug. 6, 1946 |
| 2,422,135 | Sanders | June 10, 1947 |
| 2,426,187 | Earp | Aug. 26, 1947 |
| 2,431,854 | Wood | Dec. 2, 1947 |
| 2,433,361 | Harrison | Dec. 30, 1947 |
| 2,450,352 | Piety | Sept. 28, 1948 |
| 2,475,609 | Gauld | July 12, 1949 |
| 2,638,586 | Guanella | May 12, 1953 |